US012781139B2

(12) United States Patent
Xin et al.

(10) Patent No.: US 12,781,139 B2
(45) Date of Patent: Nov. 3, 2026

(54) PROCESS OF ABSORPTION AND STABILIZATION UNIT AND COMPREHENSIVE UTILIZATION METHOD OF PRODUCTS THEREFROM

(71) Applicant: Zhejiang Comy Environment Technology Co., Ltd., Ningbo (CN)

(72) Inventors: Benen Xin, Ningbo National Hi-Tech Industrial Devel (CN); Zongjun Ye, Ningbo National Hi-Tech Industrial Devel (CN); Wei Hong, Ningbo National Hi-Tech Industrial Devel (CN)

(73) Assignee: Zhejiang Comy Environment Technology Co., Ltd., Zhejiang Province (CN)

( * ) Notice: Subject to any disclaimer, the term of this patent is extended or adjusted under 35 U.S.C. 154(b) by 153 days.

(21) Appl. No.: 18/697,735

(22) PCT Filed: May 31, 2022

(86) PCT No.: PCT/CN2022/096161
§ 371 (c)(1),
(2) Date: Apr. 2, 2024

(87) PCT Pub. No.: WO2023/060906
PCT Pub. Date: Apr. 20, 2023

(65) Prior Publication Data

US 2024/0400915 A1 Dec. 5, 2024

(30) Foreign Application Priority Data

Oct. 13, 2021 (CN) ......................... 202111193024.X

(51) Int. Cl.
*C10G 53/08* (2006.01)
*B01D 3/14* (2006.01)
(Continued)

(52) U.S. Cl.
CPC ............. *C10G 53/08* (2013.01); *B01D 3/143* (2013.01); *B01D 5/006* (2013.01); *B01J 8/0278* (2013.01);
(Continued)

(58) Field of Classification Search
CPC ............ C10G 53/08; C10G 2300/4081; C10G 2400/20; C10G 70/04; C10G 70/041;
(Continued)

(56) References Cited

U.S. PATENT DOCUMENTS

2017/0321132 A1 11/2017 Sui et al.

FOREIGN PATENT DOCUMENTS

CA 645372 A 7/1962
CN 102382680 A 3/2012
(Continued)

OTHER PUBLICATIONS

CN113354501B English Translation (Year: 2021).*

*Primary Examiner* — Ellen M McAvoy
*Assistant Examiner* — Chantel Graham
(74) *Attorney, Agent, or Firm* — Riyon Rae Harding

(57) ABSTRACT

The present invention relates to a novel process of an absorption and stabilization unit, comprising operation steps of: S1, primary compression of rich gas, S2, secondary compression of rich gas, S3, dry gas absorption, S4, gasoline stabilization, and so on. After rich gas from a catalytic fractionation unit undergoes operations such as primary compression, rectification using a de-heavy fractionator, and secondary compression, the gas phase mainly composed of C3 from the top of the de-heavy fractionator and naphtha from the catalytic fractionation unit are absorbed in an absorption tower, and dry gas of unabsorbed components is discharged from the top of the absorption tower; rich-absorption oil from the bottom of the absorption tower and
(Continued)

the liquid phase mainly composed of C4 from the bottom of the de-heavy fractionator enter an stabilization tower to perform stable operation. The novel process of the absorption and stabilization unit of the present invention can obviously reduce the energy consumed by the absorption and stabilization unit by means of step-by-step compression, and facilitates further utilization of products from the absorption and stabilization unit. The present invention also relates to a method for comprehensive utilization of products from the absorption and stabilization unit, for maximizing the conversion of effective components in stabilized gasoline, liquefied gas, and dry gas after the novel absorption and stabilization process into high value-added chemical products such as propylene.

16 Claims, 3 Drawing Sheets

(51) Int. Cl.

| | |
|---|---|
| ***B01D 5/00*** | (2006.01) |
| ***B01J 8/02*** | (2006.01) |
| ***B01J 8/18*** | (2006.01) |
| ***B01J 8/26*** | (2006.01) |

(52) U.S. Cl.
CPC ............... *B01J 8/1827* (2013.01); *B01J 8/26* (2013.01); *C10G 2300/4081* (2013.01); *C10G 2400/20* (2013.01)

(58) Field of Classification Search
CPC ...... C10G 70/043; C10G 70/06; C10G 70/00; B01D 3/143; B01D 5/006; B01J 8/0278; B01J 8/1827; B01J 8/26
See application file for complete search history.

(56) References Cited

FOREIGN PATENT DOCUMENTS

| | | | | | |
|---|---|---|---|---|---|
| CN | 104177214 A | | 12/2014 | | |
| CN | 105647583 A | | 6/2016 | | |
| CN | 107227172 B | | 5/2019 | | |
| CN | 112707786 A | | 4/2021 | | |
| CN | 112707787 A | | 4/2021 | | |
| CN | 113354501 A | | 9/2021 | | |
| CN | 113845939 A | | 12/2021 | | |
| CN | 113354501 B | * | 11/2022 | ......... | B01D 53/1493 |
| JP | 2007222847 A | | 9/2007 | | |

* cited by examiner

PROCESS OF ABSORPTION AND STABILIZATION UNIT AND COMPREHENSIVE UTILIZATION METHOD OF PRODUCTS THEREFROM

CROSS-REFERENCE TO RELATED APPLICATION

This application is based upon and claims priority to PCT Application No. PCT/CN2022/096161 filed on May 31, 2022, which takes priority from, Application No. CN 202111193024.X, filed on Oct. 13, 2021 the entireties of both of which are incorporated herein by reference for all purposes.

TECHNICAL FIELD

The present disclosure relates to the technical field of petroleum refining, and more particularly, to a novel process of an absorption-stabilization unit and a comprehensive utilization method of products therefrom.

BACKGROUND

The absorption-stabilization unit is a post-treatment process in the catalytic cracking units within the petroleum refining industry. It is used to separate the rich gas and crude gasoline from the fractionator overhead gas separation tank into dry gas (C2 and lighter), liquefied gas (C3-C4), and stabilized gasoline with qualified vapor pressure through absorption and fractionation principles. The equipment and process optimization of the absorption-stabilization unit plays a very important role in energy saving and efficiency enhancement for catalytic cracking.

In the chemical industry, the demand for propylene in the polypropylene sector is increasing year by year. The supply of propylene monomer cannot meet the demand, prompting research into how to comprehensively utilize the rich gas and crude gasoline from catalytic cracking units to maximize the production of high-value chemical products. On the other hand, with the increasing pressure for energy conservation and emission reduction, how to reduce energy consumption has also become a focus of attention.

With an increasing number of PDH (Propane Dehydrogenation) units being constructed domestically, and given the constraints on propane raw materials and technology, blindly investing in the construction of PDH units poses a great risk. To alleviate the constraints on propane raw materials and the risk level of PDH units, research into how to comprehensively utilize the rich gas and crude gasoline from catalytic cracking units is being prompted.

SUMMARY

In light of the shortcomings of the existing technology, the present disclosure provides a novel process of an absorption-stabilization unit and a comprehensive utilization method of the products therefrom, which significantly reduces the energy consumption of the system and allows for the comprehensive utilization of rich gas and crude gasoline from the catalytic cracking unit after absorption-stabilization, thereby maximizing the production of high-value chemical products.

To achieve these goals, the technical solution provided by the present disclosure is as follows:

A novel process of an absorption-stabilization unit, which includes the following steps of:

S1 performing a primary compression of a rich gas: compressing the rich gas from a catalytic fractionation unit using a first compressor to a pressure of 0.6±0.2 MPa, wherein the compressed rich gas is directly fed into a de-heavy tower for separation by rectification; condensing the overhead fraction of de-heavy tower and subjected it to a gas-liquid separation inside a first reflux tank, obtaining a liquid phase mainly containing C3 and C4, and a gas phase mainly containing C3, wherein the liquid phase mainly containing C3 and C4 is partially refluxed, and partially discharged to a tank farm or a C3 removal tower;

S2 performing a secondary compression of the rich gas: introducing the gas phase mainly containing C3 from the top of the first reflux tank to an inlet of a second compressor, where it is compressed to 1.4±0.3 MPa by the second compressor; after the secondary compression, the gas phase is condensed and subjected to a gas-liquid separation inside a second reflux tank, with the separated liquid phase being discharged to a C3 removal tower, and the gas phase being fed to the bottom of an absorption tower;

S3 performing an absorption operation of dry gases: injecting the crude gasoline from the catalytic fractionation unit into the top of the absorption tower, where the crude gasoline is contacted with the gas phase materials from the bottom of the absorption tower, wherein the crude gasoline absorbs C3 and C4 components from the gas phase materials to form a rich-absorption oil, while the unabsorbed components, i.e., dry gases, are drawn off from the top of the absorption tower;

S4 performing a gasoline stabilization operation: feeding materials from the bottom of the de-heavy tower and the rich-absorption oil from the bottom of the absorption tower respectively into a stabilization tower, wherein a liquefied gas fraction is drawn off from the top of the stabilization tower, and a gasoline fraction is drawn off from the bottom of stabilization tower.

In a further embodiment of the technical solution, an operating pressure of the de-heavy tower is 0.6±0.2 MPa, a temperature at the bottom of the tower is between 60 to 180° C., and the temperature at the top of the tower is between 40 to 70° C.

Another aspect of the present disclosure is to provide a comprehensive utilization method of the products of the absorption-stabilization unit, which includes the steps of the process of the absorption-stabilization unit as described above; it also includes the following steps of:

S3-1: transporting dry gases with a high ethylene content from the top of the absorption tower sequentially to a heat exchanger and a heater for heating, and then introducing the dry gases into a fixed-bed reactor, wherein the catalyst loaded in the fixed bed reactor is one or a combination of ZSM5, ZSM35, or MCM series of molecular sieves, and wherein the olefins in the dry gases are converted into olefins mainly containing C4 to C8 within the fixed-bed reactor, and the olefin products are fed to a first fluidized bed reactor;

S4-1: pumping the gasoline fraction from the bottom of the stabilization tower to the first fluidized bed reactor, wherein the olefins in the gasoline fraction and the olefin products from step S3-1 are cracked within the first fluidized bed reactor; the catalyst loaded in the first fluidized bed reactor is one or a combination of ZSM5, ZSM35, SAPO, or MCM series of molecular sieves; the cracked products are cooled via heat exchange before being entered into a three-phase separator; the gas phase components mainly containing C3 and C4 are drawn off from the top of the three-phase separator and merged with the rich gas from the catalytic fractionation unit, then returned to the de-heavy tower through the first compressor; an uncracked gasoline is drawn off from the bottom of the three-phase separator, and the uncracked gasoline is rectified and subsequently discharged to a tank farm, wherein the aromatics are further purified through a solvent extraction process to obtain monomers such as benzene, toluene, and xylene;

S4-2: pumping the liquefied gas from the top of the stabilization tower into the C3 removal tower, wherein the C3 gas phase is drawn off from the top of the C3 removal tower and a C4 fraction is drawn off from the bottom of the C3 removal tower; the C3 gas phase is pumped into a C2 removal tower after being condense, wherein the C2 fraction is drawn off from the top of the C2 removal tower, mixed with the dry gas, and then fed into the S3-1 fixed-bed reactor; a C3 liquid phase, namely a mixture of propane and propylene, is drawn off from the bottom of the C2 removal tower; the C3 liquid phase is divided into two streams, wherein one is fed to a high-pressure propylene rectification tower and the other fed to a first low-pressure propylene rectification tower, or, the C3 liquid phase is divided into three streams fed respectively to a high-pressure propylene rectification tower, a first low-pressure propylene rectification tower, and a second low-pressure propylene rectification tower, with the products of each tower's rectification operation being high-purity propane and propylene; the temperature at the top of the high-pressure propylene rectification tower is 3 to 15° C. higher than the temperature at the bottom of the first low-pressure propylene rectification tower; the temperature at the top of the first low-pressure propylene rectification tower is 3 to 15° C. higher than the temperature at the bottom of the second low-pressure propylene rectification tower; the operating pressure of the high-pressure propylene rectification tower is 2.6±0.6 MPa, the temperature at the bottom of the tower is 60 to 100° C., and the temperature at the top of the tower is 55 to 80° C.; the operating pressure of the first low-pressure propylene rectification tower is 1.6±0.4 MPa, the temperature at the bottom of the tower is 50 to 75° C., and the temperature at the top of the tower is 35 to 60° C.; the operating pressure of the second low-pressure propylene rectification tower is 0.6±0.3 MPa, the temperature at the bottom of the tower is 20 to 45° C., and the temperature at the top of the tower is 5 to 25° C.;

S4-3: pumping the C4 fraction from the bottom of the C3 removal tower into a C4 reforming unit, which is equipped with a pretreatment reactor and a catalytic rectification tower; the catalyst filled in the pretreatment reactor consists of a combination of one or several types from the ZSM5, ZSM35, or MCM series of molecular sieves; after the C4 mixture is processed sequentially through the pretreatment reactor and the catalytic rectification tower, butane is drawn off from the top of the catalytic rectification tower, and butene reformation products are drawn off from the bottom of the catalytic rectification tower, wherein the butene reformation products are subsequently fed to a second fluidized bed reactor for further cracking into gas phase components mainly containing C3 and C4, and wherein the second fluidized bed reactor is filled with a catalyst that is a combination of one or several types from the ZSM5, ZSM35, SAPO, or MCM series of molecular sieves, and the gas phase component is also merged with the rich gas from the catalytic fractionation unit and returned to the de-heavy tower through the first compressor.

In further technical solutions, the reaction temperature of the fixed-bed reactor is 300 to 500° C., the reaction pressure is 0.3 to 3.0 MPa, and the space velocity is 0.1 to 10 h-1. Additionally, the fixed-bed reactor operates under gas-phase conditions, with an olefin conversion rate greater than 85 m %. The main reactions inside the fixed-bed reactor are represented by Formula 1 or Formula 2 as shown:

$$NC_m^= \rightarrow C_K^=; \qquad \text{Formula 1}$$

where N=2, 3, or 4; M=2 or 3; K=N*M;

$$AC_2^= + BC_3^= \rightarrow C_L^=; \qquad \text{Formula 2}$$

where A=1, 2, or 3; B=1, 2, or 3;

$A+B \le 4; L=A*2+B*3.$

In further technical solutions, the reaction temperature of the first fluidized bed reactor is 350 to 650° C., the reaction pressure is 0.05 to 1.0 MPa, and the space velocity is 1 to 30 h-1. The reaction temperature of the second fluidized bed reactor is 300 to 550° C., the reaction pressure is 0.01 to 1.0 MPa, and the space velocity is 10 to 50 h-1. The cracking reactions in the first and second fluidized bed reactors exhibit significant selectivity, namely, selectivity 1: the yield of dry gas in the cracked products does not exceed 0.5%; selectivity 2: high yield of propane and butane, low yield of propylene and butylene, in which case one of the reactors is filled with ZSM35 catalyst, while the other is filled with a combination of ZSM35, MCM, and SAPO series of molecular sieves; selectivity 3: high yield of propylene and butylene, low yield of propane and butane, in which case one of the reactors is filled with ZSM5 catalyst, while the other is filled with a combination of ZSM5, SAPO, or MCM series of molecular sieves. The main cracking reactions are as shown in Formulas 3-1 and 3-2:

$$C_K^= \text{ and/or } C_L^= \rightarrow C_3^= + C_4^=. \qquad \text{Formula 3-1}$$

$$C_K^= \text{ and/or } C_L^= \rightarrow C_3^0 + C_4^0. \qquad \text{Formula 3-2}$$

In further technical solutions, the ratio of the feed flow rate of the C3 liquid phase in the high-pressure propylene rectification tower to the feed flow rate of the C3 liquid phase in the low-pressure propylene rectification tower is 0.5 to 2.0:1.

Moreover, in further technical solutions, the high-pressure propylene rectification tower and the low-pressure propylene rectification tower operate in a thermal-coupling manner, i.e., the oil gas from the top of the high-pressure propylene rectification tower serves as the heat source for the reboiler of the first low-pressure propylene rectification tower. Compared to conventional single-tower propylene rectification, this configuration achieves an energy saving effect of no less than 40%. In even further technical solutions, a three-tower thermal-coupling operation is conducted involving the high-pressure propylene rectification tower, the first low-pressure propylene rectification tower, and the second low-pressure propylene rectification tower (not shown in the diagram), wherein the oil gas from the top of the high-pressure propylene rectification tower serves as the heat source for the reboiler of the first low-pressure propylene rectification tower, and the oil gas from the top of the first low-pressure propylene rectification tower serves as the heat source for the reboiler of the second low-pressure propylene rectification tower, to further enhance the energy-saving effect.

In further technical solutions, within the C4 reforming unit, the reaction temperature of the pretreatment reactor is 30 to 300° C., the reaction pressure is 0.05 to 6.0 MPa, and the space velocity is 0.1 to 10 h-1. The C4 reforming unit operates under liquid phase conditions with an olefin conversion rate greater than 90 m %. The operating pressure of the catalytic rectification tower is 0.6+0.3 MPa, with the bottom temperature of 60 to 200° C. and the top temperature of 30 to 70° C. In the C4 reforming unit, C4 olefin components undergo selective reformation reactions in the pretreatment reactor, as shown in Formula 4:

$$NC_4^= \rightarrow C_K^=; \qquad \text{Formula 4}$$

where N=2, 3, or 4; and K=N*4.

Beneficial Effects of the Disclosure

The present disclosure introduces a novel process of the absorption-stabilization unit, which significantly reduces the energy consumption of the absorption-stabilization unit through stepwise compression, facilitating further utilization of the products from the absorption-stabilization unit.

In the comprehensive utilization method of the products of the disclosure's absorption-stabilization unit, the effective components in the stabilized gasoline, the liquefied gas, and dry gases from the absorption and stabilization process are maximally converted into high-value-added chemical products like propylene. This conversion is achieved through cracking and reformation reactions in operational units such as the fixed bed reactor, the first fluidized bed reactor, the second fluidized bed reactor, the pretreatment reactor, and the catalytic rectification tower, along with their corresponding separation operations.

In these figures: de-heavy tower T1, stabilization tower T2, absorption tower T3, fixed bed reactor R1, first fluidized bed reactor R2, second fluidized bed reactor R3, heater L1, first compressor C1, second compressor C2, first reflux tank G1, second reflux tank G2, third reflux tank G3, fourth reflux tank G4, fifth reflux tank G5, sixth reflux tank G6, seventh reflux tank G7, three-phase separator F1, C3 removal tower T4, C2 removal tower T5, high-pressure propylene rectification tower T6, first low-pressure propylene rectification tower T7, pretreatment reactor R4, catalytic rectification tower T8, 1 #pump P1, 2 #pump P2, 3 #pump P3, 4 #pump P4, 5 #pump P5, 6 #pump P6, 7 #pump P7, 8 #pump P8, 9 #pump P9, 10 #pump P10 and 11 #pump P11.

DETAILED DESCRIPTION

The following description is disclosed to enable those skilled in the art to implement the disclosure.

Embodiment 1

Figure 1:
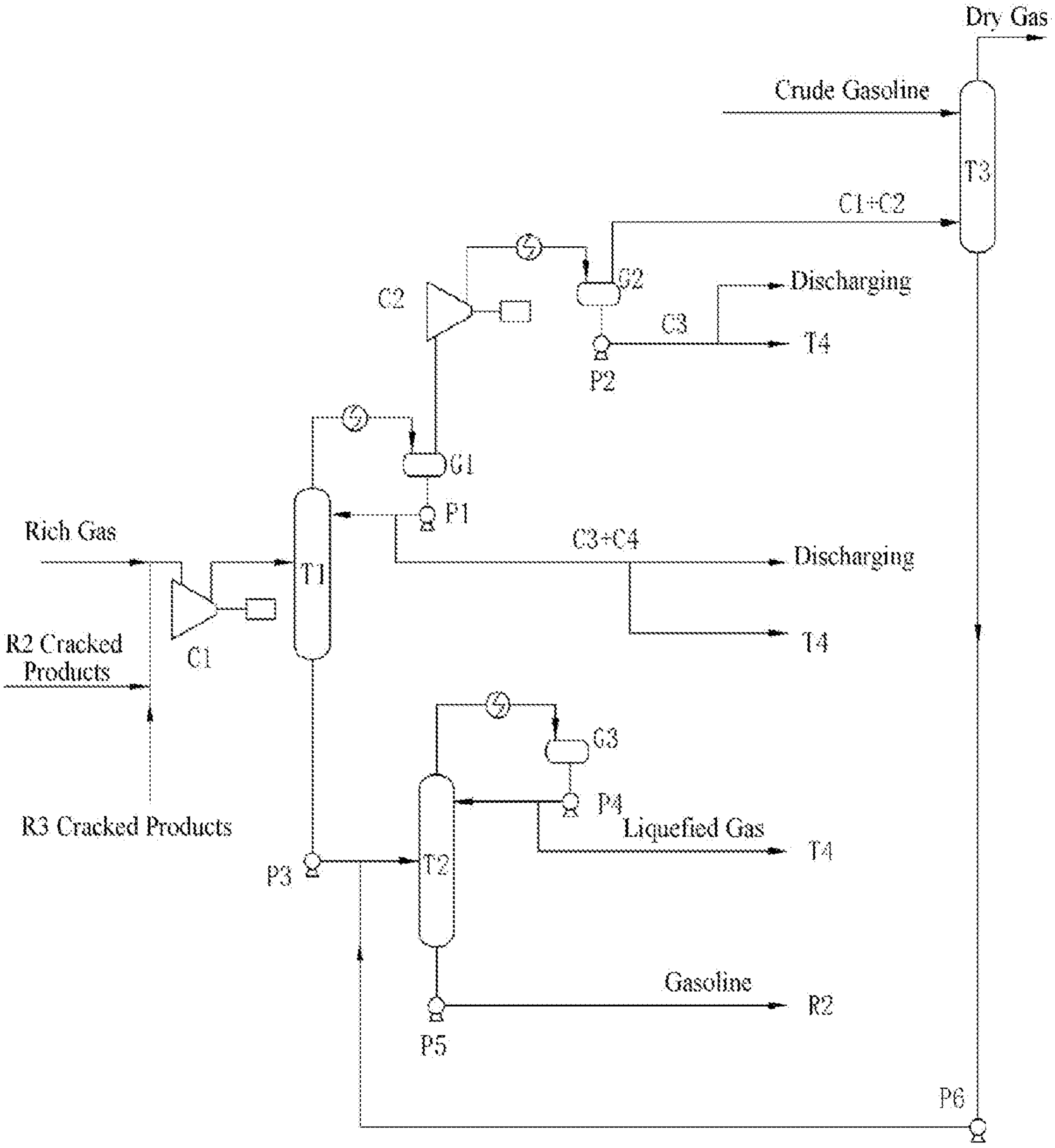
FIG. 1 is a flowchart of the process of the absorption-stabilization unit of the present disclosure.
Figure 2:
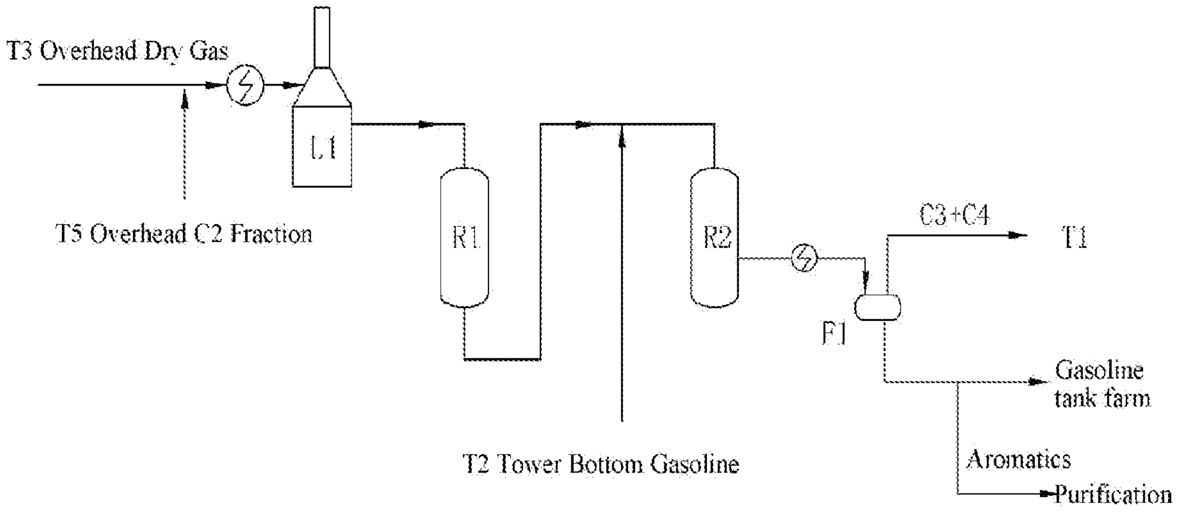
FIG. 2 is a flowchart of steps S3-1 and S4-1 for the comprehensive utilization method of the products of the absorption-stabilization unit of the present disclosure.
Figure 3:
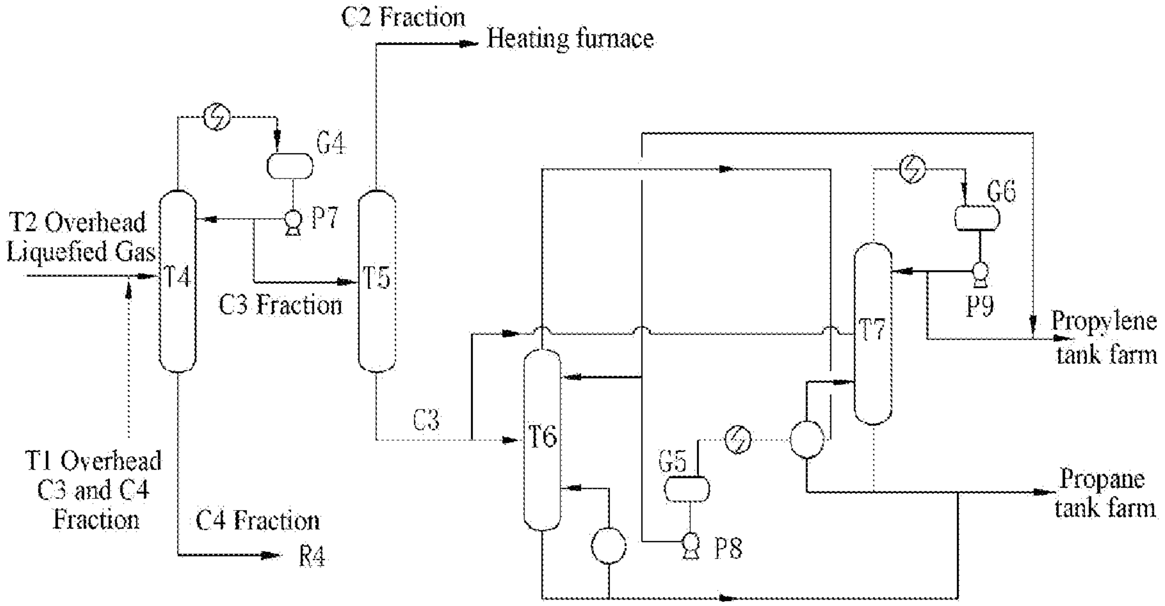
FIG. 3 is a flowchart of step S4-2 for the comprehensive utilization method of the products of the absorption-stabilization unit of the present disclosure.
Figure 4:
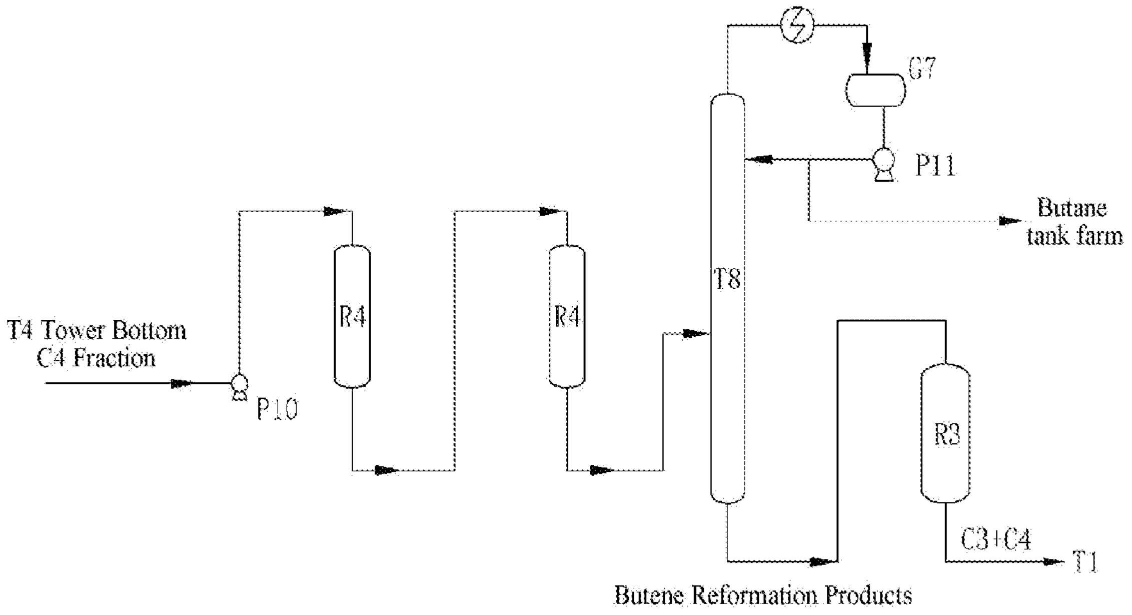
FIG. 4 is a flowchart of step S4-3 for the comprehensive utilization method of the products of the absorption-stabilization unit of the present disclosure.

As shown in FIGS. 1 to 4, the process of the absorption-stabilization unit and the comprehensive utilization method of products therefrom of this embodiment particularly include the following steps.

S1 performing a primary compression of a rich gas: the rich gas from the catalytic fractionation unit is primary compressed by the first compressor C1, and pressurized to 0.6 MPa; the pressurized rich gas is directly introduced into the de-heavy tower T1 for separation by rectification; the operating pressure of the de-heavy tower T1 is 0.6 MPa, with the bottom temperature of 120° C. and the top temperature of 55° C.; the top fraction of the de-heavy tower T1 is condensed in the first reflux tank G1 for a gas-liquid separation, obtaining a liquid phase mainly containing C3C4 and a gas phase mainly containing C3; wherein, the liquid phase mainly comprising C3C4 is partially recirculated by 1 #pump P1, and partially discharged to the C3 removal tower T4.

S2 performing a secondary compression of the rich gas: the gas phase mainly containing C3 is drawn off from the top of the first reflux tank G1 to the inlet of the second compressor C2, wherein it is pressurized to 1.4 MPa by the second compressor C2; after the second pressurization, the gas phase is condensed in the second reflux tank G2 for a gas-liquid separation, wherein the obtained liquid phase is fed to the C3 removal tower T4 by 2 #pump P2, and the gas phase is fed to the bottom of the absorption tower T3. Stepwise compression can significantly reduce the energy consumption of the absorption-stabilization unit and facilitate further utilization of the products of the absorption-stabilization unit.

S3 performing an absorption of dry gases: crude gasoline from the catalytic fractionation unit is injected into the top of the absorption tower T3, wherein it is contacted with the gas phase materials introduced from the bottom of the absorption tower T3, absorbing C3 and C4 components from the gas phase materials; unabsorbed components, i.e., dry gases, are drawn off from the top of the absorption tower T3.

S3-1: transporting the dry gases containing a large amount of ethylene from the top of the absorption tower T3 in sequence to a heat exchanger and a heating furnace L1 for heating, then introducing the dry gases into a fixed bed reactor R1, wherein the reaction occurs under gas phase conditions with an olefin conversion rate of more than 85 m %; the catalyst filled in the fixed bed reactor R1 is ZSM5 molecular sieve; the reaction temperature in the fixed bed reactor R1 is 400° C., the reaction pressure is 1.5 MPa, and the space velocity is 5 h-1; the olefins in the dry gases form olefins mainly containing C4 to C8 in the fixed bed reactor R1, and all these olefin products are fed to the first fluidized bed reactor R2.

S4 performing a gasoline stabilization: the materials from the bottom of the de-heavy tower T1 and the rich-absorption oil from the bottom of the absorption tower T3 are fed to the stabilization tower T2 through 3 #pump P3 and 6 #pump P6, respectively; the rich-absorption oil from the bottom of the absorption tower T3 can also be introduced into the stabilization tower T2 directly by gravity without the need for pump #6 P6; a liquefied gas fraction is produced at the top of the stabilization tower T2, and the gaseous liquefied gas fraction is condensed in a condenser and subsequently flows to the third reflux tank G3, which is subsequently pumped to the C3 removal tower T4 by 4 #pump P4; a gasoline fraction is produced at the bottom of the stabilization tower T2, wherein the gasoline fraction is fed to the first fluidized bed reactor R2 by 5 #pump P5.

S4-1: the gasoline fraction from the stabilization tower T2 is pumped to the first fluidized bed reactor R2, where the olefins in the gasoline fraction and the olefin products from step S3-1 are cracked. The catalyst filled in the first fluidized bed reactor R2 is ZSM-5 molecular sieve. The reaction temperature in the first fluidized bed reactor R2 is 500° C., the reaction pressure is 0.15 MPa, and the space velocity is 15 h-1. The cracked products, after being cooled by heat exchange, are introduced into the three-phase separator F1. The gas phase components, mainly containing C3 and C4, are drawn off from the top of the three-phase separator F1 and merged into the rich gas of the catalytic fractionation unit, then returned to the de-heavy tower T1 via the first compressor C1. The uncracked gasoline from the bottom of the three-phase separator F1 is rectified and then sent to the tank farm, and the aromatic contents in the uncracked gasoline can be further purified to obtain monomers such as benzene, toluene, and xylene through a solvent extraction process.

S4-2: the liquefied gas from the top of the stabilization tower T2 is pumped into the C3 removal tower T4, from which a C3 gas phase is draw off from the top of the C3 removal tower T4 and a C4 fraction is drawn off from the bottom of the C3 removal tower T4. The C3 gas phase, after being condensed, flows to the fourth reflux tank G4, and is subsequently sent to the C2 removal tower T5 via 7 #pump P7. The C2 fraction is drawn off from the top of the C2 removal tower T5 and, after being heated in heater L1 and mixed with dry gas, is introduced into the fixed bed reactor R1 of step S3-1. The liquid phase C3, a mixture of propane and propylene, is divided into two streams that are sent to the high-pressure propylene rectification tower T6 and the first low-pressure propylene rectification tower T7, respectively. After separation by rectification in these towers, high-purity propane and propylene are obtained. The high-pressure propylene rectification tower T6 and the first low-pressure propylene rectification tower T7 are thermally coupled. In other words, the gas phase propylene from the top of the high-pressure tower T6 serves as the heat source for the reboiler of the bottom of the first low-pressure tower T7. The gas phase propylene material from the top of the high-pressure propylene rectification tower T6 is used as a heat source, introduced into the reboiler inlet of the bottom of the first low-pressure propylene rectification tower T7, and after condensation, flows to the fifth reflux tank G5. Finally, the gas phase propylene material from the top of the high-pressure propylene rectification tower T6 is partially recirculated to the high-pressure propylene rectification tower T6 via 8 #pump P8 and partially sent to the propylene tank farm. The liquid phase propane material from the bottom of the high-pressure propylene rectification tower T6 is partially recirculated through the bottom reboiler to the tower T6 and partially sent to the propane tank farm. The gas phase propylene material from the top of the first low-pressure propylene rectification tower T7, after condensation, flows to the sixth reflux tank G6, and then is partially recirculated to the first low-pressure propylene rectification tower T7 via 9 #pump P9, with the remainder sent to the propylene tank farm. The liquid phase propane material from the bottom of the first low-pressure propylene rectification tower T7 is partially recirculated through the bottom reboiler to the tower T7, with the remainder sent to the propane tank farm. The temperature at the top of the high-pressure propylene rectification tower T6 is 6° C. higher than the temperature at the bottom of the first low-pressure propylene rectification tower T7. The ratio of the feed flow rate of the C3 liquid phase in the high-pressure propylene rectification tower T6 to that in the first low-pressure propylene rectification tower T7 is 1.1:1. The operating pressure of the high-pressure propylene rectification tower T6 is 2.6 MPa, with the bottom temperature of 74° C. and the top temperature of 63° C. The operating pressure of the first low-pressure propylene rectification tower T7 is 1.6 MPa, with the bottom temperature of 53° C. and the top temperature of 40° C. Compared to conventional single-tower propylene rectification, the propylene rectification towers operating in a thermal coupling manner according to the present disclosure achieve an energy-saving effect of no less than 40%. As a further optimization, a three-tower thermal coupling operation for propylene rectification can be adopted, further enhancing the energy-saving effect. In this arrangement, the gas phase from the top of the first low-pressure propylene rectification tower serves as the heat source for the reboiler of the bottom of the second low-pressure propylene rectification tower. The temperature at the top of the first low-pressure propylene rectification tower is 3° C. to 15° C. higher than the temperature at the bottom of the second low-pressure propylene rectification tower. For example, the operating pressure of the second low-pressure propylene rectification tower can be set to 0.6 MPa, with the bottom temperature of 35° C. and the top temperature of 15° C.

S4-3: the C4 fraction from the C3 removal tower T4 is pumped into the C4 reforming unit by 10 #pump P10, wherein the C4 reforming unit is equipped with a pre-treatment reactor R4 and a catalytic rectification tower T8. The catalyst loaded in the pre-treatment reactor R4 is MCM molecular sieve. The reaction conditions in the C4 reforming unit are set at a temperature of 150° C., a pressure of 3.0 MPa, and a space velocity of 5 h-1, with the reaction taking place under liquid phase conditions and an olefin conversion rate of over 90 m %. The operating pressure of the catalytic rectification tower T8 is 0.6 MPa, with the bottom temperature of 170° C. and the top temperature of 50° C. After the C4 mixture is processed sequentially through the pre-treatment reactor R4 and the catalytic rectification tower T8, butane is produced at the top of tower T8. The butane is subsequently condensed and flows to the seventh reflux tank G7, from which it is partly recirculated to the catalytic rectification tower T8 by 11 #pump P11 and partly discharged to the butane tank farm. The butene reformation product is discharged from the bottom of the catalytic rectification tower T8 and is fed to the second fluidized bed reactor R3, which is loaded with a MCM molecular sieve catalyst. The reaction conditions in the second fluidized bed reactor R3 are as follows: a temperature of 420° C., a pressure of 0.15 MPa, and a space velocity of 30 h-1. The butene reformation product is again cracked into gas-phase components mainly containing C3 and C4, which are likewise integrated into the rich gas of the catalytic fractionation unit and returned to the de-heavy tower T1 via the first compressor C1. In the present disclosure, through cracking and reformation reactions and their corresponding separation operations in the fixed bed reactor R1, the first fluidized bed reactor R2, the second fluidized bed reactor R3, the pre-treatment reactor R4, and the catalytic rectification tower T8, the effective components in the stabilized gasoline, liquefied gas, and dry gas obtained after adopting the absorption-stabilization process are maximally converted into high value-added chemical products such as propylene.

The operating conditions and treatment effects of this embodiment, as a substitute for part of the technical solutions, are shown in Table 1.

Wherein, the operating conditions for Embodiments 1-1, 1a-1, 1b-1, and 1c-1 are essentially the same as those for Embodiments 1, 1a, 1b, and 1c, respectively. The difference lies in the type of catalyst loaded in the first and second fluidized bed reactors R2 and R3 for Embodiments 1-1, 1a-1, 1b-1, and 1c-1, as detailed in Table 1.

TABLE 1

| Serial No. and Name | Operating Conditions | Embodiment 1 | Embodiment 1a | Embodiment 1b | Embodiment 1c |
|---|---|---|---|---|---|
| 1 De-heavy tower T1 | Tower top pressure | 0.6 MPa | 0.4 MPa | 0.8 MPa | 0.65 MPa |
| | Tower top temperature | 55° C. | 40° C. | 70° C. | 60° C. |
| | Tower bottom temperature | 120° C. | 100° C. | 180° C. | 150° C. |
| 2 Fixed-bed Reactor R1 | Reaction temperature | 400° C. | 300° C. | 500° C. | 450° C. |
| | Reaction pressure | 1.5 MPa | 0.3 MPa | 3.0 MPa | 2.0 MPa |
| | Space velocity | 5 $h^{-1}$ | 0.1 $h^{-1}$ | 10 $h^{-1}$ | 2 $h^{-1}$ |
| | Catalyst | ZSM5 | ZSM5 | ZSM5 | ZSM5 |
| 3 First Fluidized Bed Reactor R2 | Reaction temperature | 500° C. | 350° C. | 650° C. | 550° C. |
| | Reaction pressure | 0.15 MPa | 0.05 MPa | 0.25 MPa | 0.10 MPa |
| | Space velocity | 15 $h^{-1}$ | 1 $h^{-1}$ | 30 $h^{-1}$ | 20 $h^{-1}$ |
| | Catalyst | ZSM5 | ZSM5 | ZSM5 | ZSM5 |
| 4 Second Fluidized Bed Reactor R3 | Reaction temperature | 420° C. | 550° C. | 350° C. | 500° C. |
| | Reaction pressure | 0.15 MPa | 0.35 MPa | 0.05 MPa | 0.20 MPa |
| | Space velocity | 30 $h^{-1}$ | 10 $h^{-1}$ | 50 $h^{-1}$ | 40 $h^{-1}$ |
| | Catalyst | MCM | MCM | MCM | MCM |
| 5 High-pressure Propylene Rectification tower T6 | Tower top pressure | 2.6 MPa | 2.2 MPa | 3.2 MPa | 3.0 MPa |
| | Tower top temperature | 63° C. | 56° C. | 74° C. | 70° C. |
| | Tower bottom temperature | 74° C. | 69° C. | 85° C. | 82° C. |
| | Feed ratio to Tower T7 | 1.1:1 | 0.8:1 | 1.5:1 | 1.3:1 |
| 6 First Low-pressure Propylene Rectification tower T7 | Tower top pressure | 1.6 MPa | 1.2 MPa | 2.2 MPa | 1.8 MPa |
| | Tower top temperature | 40° C. | 35° C. | 55° C. | 45° C. |
| | Tower bottom temperature | 53° C. | 48° C. | 66° C. | 58° C. |
| 7 Pretreatment Reactor R4 | Reaction temperature | 150° C. | 30° C. | 220° C. | 200° C. |
| | Reaction pressure | 3.0 MPa | 0.05 MPa | 6.0 MPa | 4.0 MPa |
| | Space velocity | 5 $h^{-1}$ | 0.5 $h^{-1}$ | 10 $h^{-1}$ | 7 $h^{-1}$ |
| | Catalyst | MCM | MCM | MCM | MCM |
| 8 Catalytic Rectification tower T8 | Tower top pressure | 0.6 MPa | 0.3 MPa | 0.9 MPa | 0.7 MPa, |
| | Tower top temperature | 50° C. | 30° C. | 70° C. | 60° C. |
| | Tower bottom temperature | 170° C. | 108° C. | 210° C. | 180° C. |
| 9 | Total yield of propylene (≥%) | 40 m % | 35 m % | 45 m % | 37 m % |
| 10 | Energy savings (≥%) | 42% | 40% | 50% | 45% |

| | Embodiment 1-1 | Embodiment 1a-1 | Embodiment 1b-1 | Embodiment 1c-1 |
|---|---|---|---|---|
| 11 Catalyst for the first fluidized bed reactor R2 | ZSM35 | ZSM35 | ZSM35 | ZSM35 |
| 12 Catalyst for the second fluidized bed reactor R3 | SAPO | SAPO | SAPO | SAPO |

TABLE 1-continued

| | | | | | |
|---|---|---|---|---|---|
| 13 | Total yield of propane and butane (≥%) | 65 m % | 60 m % | 70 m % | 62 m % |
| 14 | Energy savings (≥%) | 42% | 40% | 50% | 45% |

From the test data in Table 1, it is evident that the cracking reactions in the first fluidized bed reactor R2 and the second fluidized bed reactor R3 exhibit significant selectivity. In the process of the present disclosure, when the catalysts loaded in the first fluidized bed reactor R2 and the second fluidized bed reactor R3 are respectively ZSM5 and MCM series molecular sieves, the total yield of propylene is not less than 35 m %. In contrast, when the catalysts loaded are ZSM35 and SAPO series molecular sieves, respectively, the total yield of propane and butane is not less than 60 m %. Additionally, compared to the existing absorption-stabilization unit and its product utilization method, the method of the present disclosure for the absorption-stabilization unit and its product utilization saves more than 40% in energy consumption.

In the second aspect, this application provides an absorption-stabilization system, which may include a first compressor, a first reflux tank, a second compressor, a second reflux tank, an absorption tower, and a stabilization tower. The first compressor is used to primarily compress the rich gas from the catalytic fractionation unit, obtaining a rich gas at a pressure of 0.6±0.2 MPa. The de-heavy tower is used to separate the rich gas at a pressure of 0.6±0.2 MPa by rectification, obtaining a top fraction of the de-heavy tower. The first reflux tank is used to condense the top fraction of the de-heavy tower and separate the condensed top fraction into a liquid phase mainly containing C3-C4 and a gas phase mainly containing C3. The second compressor is used to secondarily compress the gas phase mainly containing C3, obtaining a gas phase at a pressure of 1.4+0.3 MPa mainly containing C3. The second reflux tank is used to condense the gas phase at a pressure of 1.4+0.3 MPa to obtain a liquid phase and a gas phase mainly containing C3. The absorption tower uses the crude gasoline from the catalytic fractionation unit to absorb C3 and C4 components in the gas phase mainly containing C3, forming a rich-absorption oil, with the unabsorbed components, i.e., dry gases, being drawn off from the top of the absorption tower. The stabilization tower is used to stabilize the materials from the bottom of the de-heavy tower and the rich-absorption oil from the bottom of the absorption tower, wherein a liquefied gas fraction is drawn off from the top of the stabilization tower and a gasoline fraction is drawn off from the bottom of the stabilization tower.

In one embodiment of the second aspect, the absorption-stabilization system further includes a fixed-bed reactor, a first fluidized bed reactor, and a three-phase separator. The fixed-bed reactor is used to react the olefins in the dry gases from the absorption tower to produce olefins mainly containing C4 to C8, which are then entirely sent to the first fluidized bed reactor. The first fluidized bed reactor is used to crack the olefins mainly containing C4 to C8 from the fixed-bed reactor and the gasoline fraction from the bottom of the stabilization tower, obtaining cracked products. The three-phase separator is used to separate these cracked products, wherein a gas phase mainly containing C3 and C4 is drawn off from the top of the three-phase separator, and subsequently merged into the rich gas from the catalytic fractionation unit and returned to the de-heavy tower via the first compressor. The uncracked gasoline is drawn off from the bottom of the three-phase separator.

In another embodiment of the second aspect, the absorption-stabilization system further includes a C3 removal tower and a C2 removal tower. In this embodiment, the C3 removal tower is used to remove the C3 gas phase from the liquefied gas at the top of the stabilization tower, obtaining a C3 gas phase at the top of the C3 removal tower and a C4 fraction at the bottom of the C3 removal tower. The C3 gas phase, after being condensed, is sent to the C2 removal tower, and a C2 fraction is drawn off from the top of the C2 removal tower and mixed with dry gas into the fixed-bed reactor. A liquid phase C3, a mixture of propane and propylene, is drawn off from the bottom of the C2 removal tower.

In yet another embodiment of the second aspect, the liquid phase C3 from the C2 removal tower is divided into two streams that are sent respectively to a high-pressure propylene rectification tower and a first low-pressure propylene rectification tower, or divided into three streams sent respectively to a high-pressure propylene rectification tower, a first low-pressure propylene rectification tower, and a second low-pressure propylene rectification tower, with the products of the rectification operation of each tower being high-purity propane and propylene.

In a further embodiment of the second aspect, the absorption-stabilization system also includes a C4 reforming unit and a second fluidized bed reactor. The C4 reforming unit is equipped with a pretreatment reactor and a catalytic rectification tower, which process the C4 fraction from the bottom of the C3 removal tower. After being processed sequentially through the pretreatment reactor and the catalytic rectification tower, butane is drawn off from the top of the catalytic rectification tower, and the butene reformation products are drawn off from the bottom of the catalytic rectification tower. The second fluidized bed reactor is used to further crack the butene reformation products into a gas phase mainly containing C3 and C4, which is then returned to the de-heavy tower.

The above description outlines the basic principles, main features, and advantages of the disclosure. It should be understood by those skilled in the art that the disclosure is not limited to the embodiments described above. The embodiments and descriptions provided herein illustrate the principles of the disclosure, and various changes and improvements may be made without departing from the spirit and scope of the disclosure. These changes and improvements fall within the scope of the disclosure as claimed.

What is claimed is:

1. A process of an absorption-stabilization unit, comprising the following steps of:

S1 performing a primary compression of a rich gas: compressing the rich gas from a catalytic fractionation unit by a first compressor to a pressure of 0.6±0.2 MPa, wherein the compressed rich gas is directly fed into a de-heavy tower for separation by rectification; condensing the overhead fraction of the de-heavy tower at the top of the de-heavy tower and subjecting it to a gas-liquid separation inside a first reflux tank, obtaining a liquid phase mainly containing $C_3$ and $C_4$, and a gas phase mainly containing $C_3$, wherein the liquid phase mainly containing C3C4 is partially refluxed and partially discharged to a tank farm or a C3 removal tower;

S2 performing a secondary compression of the rich gas: introducing the gas phase mainly containing $C_3$ from the top of the first reflux tank to an inlet of a second compressor, where it is compressed to 1.4±0.3 MPa by a second compressor; after the secondary compression, condensing the gas phase and subjecting it to a gas-liquid separation inside a second reflux tank, with the separated liquid phase being discharged to a $C_3$ removal tower, and the gas phase being sent to the bottom of an absorption tower;

S3 performing an absorption of dry gases: injecting the crude gasoline from the catalytic fractionation unit into the top of the absorption tower, wherein the crude gasoline is contacted with the gas phase materials from the bottom of the absorption tower, and wherein the crude gasoline absorbs $C_3$ and $C_4$ components from the gas phase materials to form a rich-absorption oil, while the unabsorbed components, i.e., the dry gases, are drawn off from the top of the absorption tower;

S4 performing a gasoline stabilization: feeding the materials from the bottom of the de-heavy tower and the rich-absorption oil from the bottom of the absorption tower respectively into a stabilization tower, wherein a liquefied gas fraction is drawn off from the top of the stabilization tower, and a gasoline fraction is drawn off from the bottom of stabilization tower;

S5: transporting the dry gases with a high ethylene content from the top of the absorption tower sequentially to a heat exchanger and a heating furnace for heating, and then introducing the dry gases into a fixed-bed reactor, wherein the olefins in the dry gases are converted into olefins mainly containing $C_4$ to $C_8$ within the fixed-bed reactor, and all the olefin products are fed to a first fluidized bed reactor;

S6: pumping the gasoline fraction from the bottom of the stabilization tower to the first fluidized bed reactor, wherein the olefins in the gasoline fraction and the olefin products from step S3-1 are cracked within the first fluidized bed reactor; the cracked products are cooled via heat exchange before being introduced into a three-phase separator; the gas phase components mainly containing $C_3$ and $C_4$ are drawn off from the top of the three-phase separator and merged with the rich gas from the catalytic fractionation unit, then returned to the de-heavy tower through the first compressor; an uncracked gasoline is drawn off from the bottom of the three-phase separator, and the uncracked gasoline is rectified and subsequently discharged to a tank farm, wherein the aromatics are further purified through a solvent extraction process to obtain monomers such as benzene, toluene, and xylene;

S7: pumping the liquefied gas from the top of the stabilization tower into the $C_3$ removal tower, wherein the $C_3$ gas phase is drawn off from the top and the $C_4$ fraction is drawn off from the bottom of the $C_3$ removal tower; the $C_3$ gas phase is pumped into a $C_2$ removal tower after being condensed, wherein the $C_2$ fraction is drawn off from the top of the $C_2$ removal tower, mixed with the dry gas, and then fed into the fixed-bed reactor of step S3-1; a $C_3$ liquid phase, namely a mixture of propane and propylene, is drawn off from the bottom of the $C_2$ removal tower; the $C_3$ liquid phase is divided into two streams, wherein one stream is fed to a high-pressure propylene rectification tower and the other stream fed to a first low-pressure propylene rectification tower, or, the C3 liquid phase is divided into three streams fed respectively to a high-pressure propylene rectification tower, a first low-pressure propylene rectification tower, and a second low-pressure propylene rectification tower, with the products of each tower's rectification operation being high-purity propane and propylene;

S8: pumping the $C_4$ fraction from the bottom of the $C_3$ removal tower into a $C_4$ reforming unit, which is equipped with a pretreatment reactor and a catalytic rectification tower; after the $C_4$ mixture is processed sequentially through the pretreatment reactor and the catalytic rectification tower, butane is drawn off from the top of the catalytic rectification tower, and butene reformation products are produced from the bottom of the catalytic rectification tower, wherein the butene reformation products are subsequently sent to a second fluidized bed reactor for further cracking into gas phase components mainly containing $C_3$ and $C_4$, and the gas phase components are also merged with the rich gas from the catalytic fractionation unit and returned to the de-heavy tower through the first compressor.

2. The process of an absorption-stabilization unit of claim 1, wherein, an operating pressure of the de-heavy tower is 0.6±0.2 MPa, a temperature at the bottom of the tower is between 60 to 180° C., and a temperature at the top of the tower is between 40 to 70° C.

3. The process of an absorption-stabilization unit of claim 1, wherein a reaction temperature of the fixed-bed reactor is between 300° C. to 500° C., a reaction pressure is between 0.3 to 3.0 MPa, and a space velocity is between 0.1 to 10 $h^{-1}$.

4. The process of an absorption-stabilization unit of claim 1, wherein the reaction in the fixed-bed reactor occurs under gas phase conditions with an olefin conversion rate greater than 85 m %.

5. The process of an absorption-stabilization unit of claim 1, wherein the reaction temperature of the first fluidized bed reactor is between 350° C. to 650° C., the reaction pressure is between 0.05 to 1.0 MPa, and a space velocity is between 1 to 30 $h^{-1}$.

6. The process of an absorption-stabilization unit of claim 1, wherein the reaction temperature of the second fluidized bed reactor is between 300° C. to 550° C., the reaction pressure is between 0.01 to 1.0 MPa, and the space velocity is between 10 to 50 $h^{-1}$.

7. The process of an absorption-stabilization unit of claim 1, wherein the temperature at the top of the high-pressure propylene rectification tower is 3° C. to 15° C. higher than the temperature at the bottom of the first low-pressure propylene rectification tower; and the temperature at the top of the first low-pressure propylene rectification tower is 3° C. to 15° C. higher than the temperature at the bottom of the second low-pressure propylene rectification tower.

8. The process of an absorption-stabilization unit of claim 1, wherein a ratio of a feed flow rate of the $C_3$ liquid phase to the high-pressure propylene rectification tower and a feed flow rate of the $C_3$ liquid phase to the low-pressure propylene rectification tower is between 0.5:1 to 2.0:1.

9. The process of an absorption-stabilization unit of claim 1, wherein the high-pressure propylene rectification tower and the low-pressure propylene rectification tower are thermally coupled, i.e., the oil gas from the top of the high-pressure propylene rectification tower serves as a heat source for a reboiler at the bottom of the first low-pressure propylene rectification tower; and the oil gas from the top of the first low-pressure propylene rectification tower serves as a heat source for another reboiler at the bottom of the second low-pressure propylene rectification tower.

10. The process of an absorption-stabilization unit of claim 1, wherein the reaction temperature of the C4 reforming unit is between 30° C. to 300° C., the reaction pressure is between 0.05 to 6.0 MPa, and a space velocity is between 0.1 to 10 $h^{-1}$.

11. The process of an absorption-stabilization unit of claim 1, wherein the reaction in the C4 reforming unit occurs under liquid phase conditions with an olefin conversion rate greater than 90 m %.

12. An absorption-stabilization system, comprising:

a first compressor for a primary compression of a rich gas from a catalytic fractionation unit, obtaining a rich gas at a pressure of 0.6±0.2 MPa;

a de-heavy tower for separation by rectification of the rich gas at the pressure of 0.6±0.2 MPa, obtaining an overhead fraction from the de-heavy tower;

a first reflux tank for condensing the overhead fraction from the de-heavy tower and performing a gas-liquid separation on the condensed overhead fraction from de-heavy tower, obtaining a liquid phase mainly containing $C_3$ and $C_4$ and a gas phase mainly containing $C_3$;

a second compressor for a secondary compression of the gas phase mainly containing $C_3$, obtaining a gas phase mainly containing $C_3$ at a pressure of 1.4±0.3 MPa;

a second reflux tank for condensing the gas phase mainly containing $C_3$ at a pressure of 1.4±0.3 MPa, obtaining a liquid phase mainly containing $C_3$ and a gas phase mainly containing $C_3$;

an absorption tower for using crude gasoline from the catalytic fractionation unit to absorb $C_3$ and $C_4$ components in the gas phase mainly containing $C_3$, forming a rich-absorption oil, with the unabsorbed components, i.e., dry gases, being drawn off from the top of the absorption tower; and a stabilization tower for stabilizing materials from the bottom of the de-heavy tower and the rich-absorption oil from the bottom of the absorption tower, with a liquefied gas fraction being produced from the top of the stabilization tower and a gasoline fraction being produced from the bottom of the stabilization tower.

13. The absorption-stabilization system of claim 12, further comprising:

a fixed-bed reactor for reacting olefins in the dry gas from the absorption tower to obtain olefins mainly containing $C_4$ to $C_8$, which are sent to a first fluidized bed reactor;

a first fluidized bed reactor for cracking olefins mainly containing $C_4$ to $C_8$ from the fixed-bed reactor and gasoline fraction from the bottom of the stabilization tower to obtain cracked products; and a three-phase separator for separating the cracked products, wherein a gas phase mainly containing $C_3$ and $C_4$ is drawn off from the top of the three-phase separator, and the gas phase is merged with the rich gas from the catalytic fractionation unit and returned to the de-heavy tower through the first compressor; and, wherein an uncracked gasoline is drawn off from the bottom of the three-phase separator.

14. The absorption-stabilization system of claim 13, further comprising:

a $C_3$ removal tower for removing $C_3$ gas phase from the liquefied gas from the top of the stabilization tower, with $C_3$ gas phase being produced from the top of the $C_3$ removal tower and $C_4$ fraction being produced from the bottom of the $C_3$ removal tower; and a $C_2$ removal tower, wherein the $C_3$ gas phase is transported to the $C_2$ removal tower after being condensed, and a $C_2$ fraction is drawn off from the top of the $C_2$ removal tower, which is mixed with dry gas and introduced into the fixed-bed reactor; and, wherein a $C_3$ liquid phase is drawn off from the bottom of the $C_2$ removal tower, i.e., a mixture of propane and propylene.

15. The absorption-stabilization system of claim 14, wherein, the $C_3$ liquid phase from the $C_2$ removal tower is divided into two streams fed respectively to a high-pressure propylene rectification tower and a first low-pressure propylene rectification tower, or, the $C_3$ liquid phase from the $C_2$ removal tower is divided into three streams fed respectively to a high-pressure propylene rectification tower, a first low-pressure propylene rectification tower, and a second low-pressure propylene rectification tower, with the products of each tower's rectification operation being high-purity propane and propylene;

preferably, the high-pressure propylene rectification tower and the first low-pressure propylene rectification tower are thermally coupled, i.e., the oil gas from the top of the high-pressure propylene rectification tower serves as a heat source for a reboiler at the bottom of the first low-pressure propylene rectification tower; and the oil gas from the top of the first low-pressure propylene rectification tower serves as a heat source for another reboiler at the bottom of the second low-pressure propylene rectification tower.

16. The absorption-stabilization system of claim 14, wherein, the absorption-stabilization system further comprises:

a $C_4$ reforming unit comprising a pretreatment reactor and a catalytic rectification tower for processing the $C_4$ fraction from the bottom of the $C_3$ removal tower; the $C_4$ fraction from the bottom of the $C_3$ removal tower is processed sequentially through the pretreatment reactor and the catalytic rectification tower, with butane being produced from the top of the catalytic rectification tower and butene reformation products being produced from the bottom of the catalytic rectification tower; and a second fluidized bed reactor for further cracking the butene reformation products into a gas phase mainly containing $C_3$ and $C_4$, wherein the gas phase mainly containing $C_3$ and $C_4$ is returned to the de-heavy tower.

* * * * *